Dec. 26, 1939.    B. C. SHIPMAN    2,184,759

HEAT EXCHANGER

Original Filed July 29, 1932

INVENTOR.
Bennet Carroll Shipman
BY
E A Fenander his
ATTORNEY.

Patented Dec. 26, 1939

2,184,759

UNITED STATES PATENT OFFICE 2,184,759

HEAT EXCHANGER

Bennet Carroll Shipman, Evansville, Ind., assignor to Servel, Inc., New York, N. Y., a corporation of Delaware Original application July 29, 1932, Serial No. 625,936. Divided and this application April 13, 1937, Serial No. 136,530

2 Claims. (Cl. 257—245)

This invention relates to heat exchangers, and more particularly to heat exchangers of the type having a plurality of plates arranged to provide a number of closely adjacent passages for effecting heat transfer between the fluids flowing through the passages. This application is a division of my application Serial No. 625,936, filed July 29, 1932.

It is an object of the invention to provide an improved heat exchanger employing a plurality of closely adjacent plates to obtain a relatively large amount of heat transfer surface in a minimum amount of space.

Figure 1:
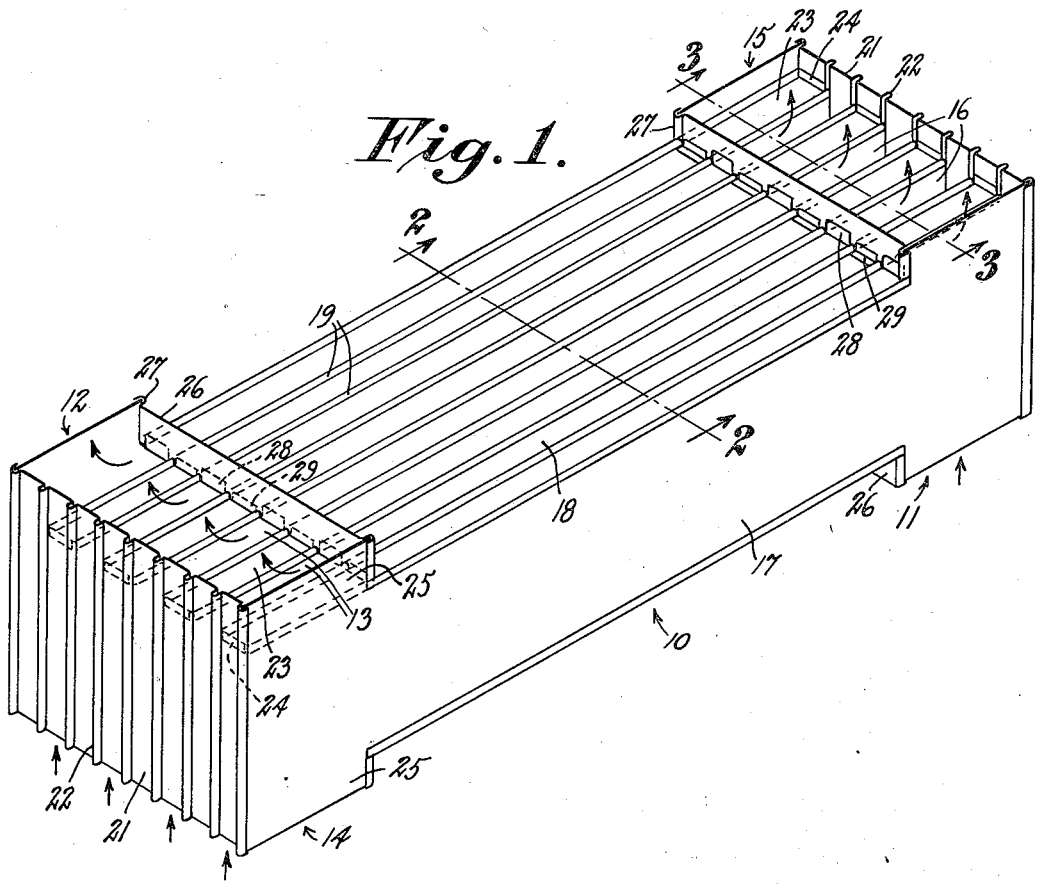
Figure 2:
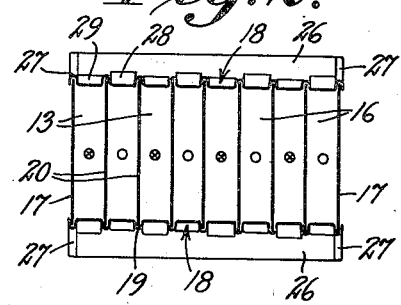
Figure 3:
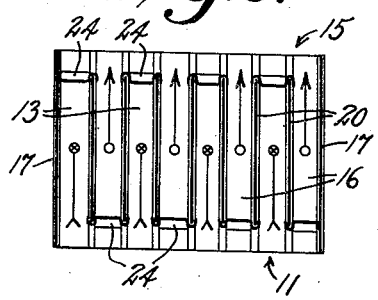

The above and further objects and advantages of the invention will become apparent from the following description taken in conjunction with the accompanying drawing forming a part of this specification, and of which Fig. 1 is a perspective view of a heat exchanger embodying the invention; and Figs. 2 and 3 are sectional views taken on lines 2—2 and 3—3, respectively, of Fig. 1, to illustrate parts of the heat exchanger more clearly.

Referring to the drawing, the heat exchanger embodying the invention includes a casing 10 having inlet and outlet openings 11 and 12 for fluid flowing through one group of passages 13, and inlet and outlet openings 14 and 15 for fluid flowing through another group of passages 16 in the casing. The casing 10 is rectangular in section and formed of side members 17 and top and bottom enclosure plates 18 having crimps or raised U-shaped bends 19 extending in a lengthwise direction.

The side members 17 and enclosure plates 18 support and maintain in properly spaced relation a plurality of heat transfer plates 20 disposed alongside each other and extending between the opposite side walls of the casing having the inlet and outlet openings. The plates 20 and enclosure plates 18 are so constructed and arranged that they form a structure which extends across the casing to provide the passages 13 and 16.

The enclosure plates 18 extend the full length of casing 10 and are provided with the parallel crimps or U-shaped bends 19 to receive the longitudinal edges of the plates 20 and side members 17. Adjacent the open ends of the casing the enclosure plates 18 are provided with a plurality of spaced slots or openings whereby alternate passages are open to provide the inlets and outlets. At the outlet 15, for example, as shown in Figs. 1 and 3, the openings in the top enclosure plate 18 are aligned with the passages 16 while the passages 13 are closed; and conversely, at the inlet 11, the openings or slots in the bottom enclosure plate 18 are aligned with the passages 13 while the passages 16 are closed.

Cover plates 21 having a plurality of crimps or U-shaped bends 22 to receive the ends of the side members 17 and plates 20 form the end walls of the casing. The portions 23 of the plates 18 extending to the cover plates 21 are provided with tabs 24 which are secured, as by welding, to the inside of the cover plates 21. The cover plates 21 are of such length that the outer ends thereof form the outer walls of duct sockets at the inlet and outlet openings 11, 12, 14 and 15. At the inlet and outlet openings the top and bottom of the side members 17 project outward to form the side walls 25 of the duct sockets.

Plates or members 26 extend across the casing at the inner edges of the openings to form the inner walls of the duct sockets. The cross members 26 are provided with a crimp or U-shaped bend 27 at each end to receive the inner edge of an outwardly projecting portion 25. The members 26 are notched to straddle the U-shaped bends 19 of the top and bottom enclosure plates 18 and are welded or soldered thereto. Tabs 28 at the inner edges of the openings or slots formed in the enclosure plates 18 are bent upward and secured, as by welding, for example, to the cross members 26. The portions of the enclosure plates 18 between the tabs 28 are secured by angle members 29 to the cross members 26.

It will now be understood that the passages 13 and 16 extend the entire length of the heat exchanger between the inlet and outlet openings 11, 12, 14 and 15. The passages 13 are open at the inlet 11 and outlet 12 and closed at the inlet 14 and outlet 15 so that fluid will flow from the inlet 11 to outlet 12 in passages 13, as indicated by the small circles and crosses in Figs. 2 and 3; and conversely, the passages 16 are open at the inlet 14 and outlet 15 and closed at the inlet 11 and outlet 12, so that fluid will flow from inlet 14 to outlet 15 in passages 16, as indicated by the small circles. The inlets and outlets have been arbitrarily chosen for counter-flow of fluids in the passages 13 and 16. It is to be understood, however, that the inlets and outlets may be chosen to provide for parallel flow of fluids in the passages 13 and 16.

In assembling the heat exchanger, it is only necessary to apply pressure to the crimps or U-shaped bends of the enclosure plates 18 and cover plates 21. The metal at the crimps is preferably tinned so that, upon application of heat and pressure, the parts of the heat exchanger may be effectively united by solder. The cross members 26, angle members 29, and tabs 24 and 28 are preferably welded in place, as described above, to effectively seal the passages 13 and 16.

Although a particular embodiment of the invention has been shown and described, it will be apparent that modifications and changes may be made without departing from the spirit and scope of the invention, as pointed out in the following claims.

What is claimed is:

1. A heat exchanger including a casing having two openings at each end thereof and comprising longitudinal side walls and end walls, a plurality of heat transfer plates disposed alongside each other within said casing between opposite side walls, said plates and the side walls of said casing forming a plurality of closely adjacent passages extending between the openings at the opposite ends of said casing, said longitudinal side walls having a plurality of projecting portions at their ends, and means including said projecting portions for closing alternate passages to one of the openings at each end of the casing and for closing the other passages to the other of the openings at each end of the casing, two of the openings at opposite ends of the casing serving as an inlet and outlet for fluid flowing through alternate passages and the other two openings at the ends of the casing serving as an inlet and outlet for fluid flowing through the other passages.

2. A heat exchanger comprising a casing including members forming end walls and other members forming longitudinal side walls, said casing having two openings adjacent both ends of two opposite side walls, a plurality of heat transfer plates disposed alongside of each other within said casing and engaging the side walls having the openings to provide a plurality of closely adjacent passages between said plates, said members forming the longitudinal side walls having spaced projecting end portions at the openings which extend to said end walls, said spaced projecting portions being formed and arranged to close alternate passages at the longitudinal edges of said plates and the spaces therebetween providing open passages between the closed passages, and two of the openings at opposite ends of said casing serving as an inlet and outlet for fluid flowing through alternate passages and the other two openings at opposite ends of the casing serving as an inlet and outlet for fluid flowing through the other passages.

BENNET CARROLL SHIPMAN.